United States Patent [19]
Day et al.

[11] Patent Number: 5,466,370
[45] Date of Patent: Nov. 14, 1995

[54] APPARATUS FOR ISOLATING SOLIDS FROM FLUIDS

[75] Inventors: James Day, Scotia; Ganesh Kailasam, Schenectady; Godavarthi S. Varadarajan, Niskayuna, all of N.Y.

[73] Assignee: General Electric Company, Schenectady, N.Y.

[21] Appl. No.: 268,367

[22] Filed: Jun. 30, 1994

[51] Int. Cl.$^6$ .................... B01D 29/02; B01D 35/027
[52] U.S. Cl. .................. 210/298; 210/295; 210/312; 210/313; 210/319; 210/513; 210/523; 100/116; 100/117
[58] Field of Search ..................... 210/295, 298, 210/312, 313, 319, 513, 523; 100/116, 117

[56] References Cited

U.S. PATENT DOCUMENTS 4,165,283   8/1979   Weber et al. ..................... 210/298
5,368,731  11/1994   Pesotini ........................... 210/298

OTHER PUBLICATIONS

Chemical Engineer's Handbook, Fifth Edition, McGraw–Hill Kogakusha, Ltd., pp. 75–85 (not dated).

Primary Examiner—Robert A. Dawson
Assistant Examiner—David Reifsnyder
Attorney, Agent, or Firm—Edward A. Squillante, Jr.; William H. Pittman

[57] ABSTRACT

A novel apparatus for isolating solids or wetcakes from fluids is disclosed. Said apparatus is closed to the atmosphere and comprises a torque sensor and movable cap which allows for solid recovery under pressure without requiring substantial solvent volatilization.

11 Claims, 3 Drawing Sheets

APPARATUS FOR ISOLATING SOLIDS FROM FLUIDS

This application is related to application U.S. Ser. No. 08/175,458, entitled "Apparatus For Separating Solids From Fluids", now U.S. Pat. No. 5,417,854.

FIELD OF THE INVENTION

This invention relates to a novel apparatus for isolating solids from fluids. More particularly, said apparatus comprises an auger, a movable cap and a torque sensor which allows for solids or wet cakes to be separated from liquids under pressure.

BACKGROUND OF THE INVENTION

For over a hundred years it has been well recognized that naturally occurring processes are inherently mixing processes and that the reverse procedure, unmixing or separation processes, typically creates challenging problems for engineers and the like. Nonetheless, many processes and apparatuses have been developed in order to transform a mixture of substances into two or more products which differ from each other in composition.

Conventional techniques which induce precipitation of solids from solutions in order to produce mixtures include crystallization, centrifugation, clarification and separation agent employment. Subsequent to mixture formation, the solids are separated from liquids by typical methods including evaporation, filtration, decanting and absorption. Such methods can be environmentally hazardous since they often require the vaporization and transporting of toxic solvents as well as the employment of expensive reagents. Moreover, known separation devices usually perform at atmospheric pressure or pressures lower than atmospheric and they often require temperature elevation before any solids may be separated from fluids.

The instant invention, therefore, relates to a novel apparatus for isolating solids from fluids. More particularly, the apparatus comprises an auger, a movable cap and a torque sensor which allows for solids and liquids to be isolated from one another (batch or continuously) under pressure without employing inefficient, energy intensive and environmentally unfavorable steps.

DESCRIPTION OF THE PRIOR ART

Apparatuses for isolating solids from solution have been disclosed in the art. In commonly assigned U.S. Pat. Nos. 4,603,194 and 4,634,761, volatilization vessels open to the atmosphere are disclosed. Said vessels comprise feed ports, outlet ports and impellers, wherein polymer solutions are fed into the vessel and heated in order to obtain polymer slurries which are subsequently centrifuged and dried in order to recover solid polymer.

Additionally, in commonly assigned U.S. Pat. No. 4,668,768, an evaporation vessel is described. Said evaporation vessel is charged with an organic solvent comprising polymer and an organic anti-solvent wherein a powdery polymer precipitate is recovered subsequent to vaporization.

In U.S. Pat. No. 5,306,807, efforts are disclosed for isolating polymers from solutions by subjecting the solutions to carbon dioxide, wherein the disclosure of said U.S. Patent is incorporated herein by reference.

Still other investigators have focused on the recovery of solids from solution. In German Patent 0,184,935 polymer resins are isolated from solution by charging a holding tank with a polymer solution and adding carbon dioxide containing fluids.

The instant invention is patentably distinguishable from the above-described since, among other reasons, it is directed to an apparatus for isolating solids from fluids wherein said apparatus comprises an auger, a torque sensor and a movable cap which allows for solids and liquids to be isolated under pressure. Moreover, in the instant invention, fluids are defined as liquids, solutions comprising solids and/or gases dissolved therein, suspensions and emulsions. Further, fluids in the instant invention can mean mixtures of miscible or immiscible solvents.

SUMMARY OF THE INVENTION

Generally speaking, the instant invention relates to an apparatus for isolating solids from fluids in a mixing vessel from a solution or mixture comprising the same. Said apparatus allows for solid and fluid separation without the need for inefficient, energy intensive and environmentally unfavorable steps such as evaporation/volatilization of substantially all liquids (organic solvents) present in the system, the necessary employment of anti-solvents and the employment of expensive separation/precipitation agents. Further, the instant apparatus may function at a variety of temperatures; however, ambient temperature is often preferred.

The needs of the instant invention are met by the above-described novel apparatus which comprises a mixing vessel (closed to the atmosphere) and a barrel which is connected to said mixing vessel. It is often preferred that the barrel is horizontal and perpendicular to said mixing vessel. However, any arrangement which allows for solid particles in the mixing vessel to enter the barrel will work; especially in the case where the solid particles are less dense than the fluid. The mixing vessel typically comprises solution/mixture and gas/liquid component inlets, a particle passage attached towards the back of said barrel, a filter attached to an outlet component and an optional motor driven agitator. The gas or liquid supplied via the gas/liquid component inlet may be either pure gas, pure liquid or gas dissolved in liquid.

The barrel comprises a posterior portion, anterior portion and, internally, an auger (fixed in length) with a posterior shaft extending through the posterior portion of the barrel and attached to a first motor drive. Said auger comprises an anterior and posterior end and flights for moving solid particles towards the anterior portion of the barrel. The first motor drive is employed to rotate the auger inside the barrel. Often, the posterior end of the auger is conical and the posterior portion of the barrel comprises an annular seat inserted therein. The posterior annular seat acts as a rest for the posterior conical end of the auger. The posterior annular seat and the posterior conical end of the auger, together, act as a posterior dynamic seal for the barrel. However, it is within the scope of the instant invention to employ any conventional posterior sealing mechanism including those which employ o-rings, compression fittings, graphite packing and magnetic couplings.

The anterior portion of the barrel comprises threads, externally. Threaded on said threads of the anterior portion of the barrel is a movable cap. Internally, the anterior portion of the barrel has a groove with an o-ring inserted therein. The movable cap comprises an opening to the atmosphere and an inner section and often comprises, internally and surrounding said opening, an anterior annular seat attached to said inner section. Often, the anterior end of the auger is conical and rests on the anterior annular seat. Together, the anterior conical end of the auger and the anterior annular seat act as an anterior dynamic seal for the barrel. As is the case for the posterior portion of the barrel, it is within the scope of the instant invention to employ any conventional anterior sealing mechanism including those which employ o-rings, compression fittings and graphite packing.

It is particularly noted in the instant invention that movable cap means a cap having an inside diameter and internal threads complementary to the outside diameter and external threads on the anterior portion of the barrel such that the cap can be fully tightened or loosened (not as to fall off) on the anterior portion of the barrel. The movable cap is activated (tightened or loosened) by a second motor drive which is regulated by a conventional torque sensor connected to the posterior shaft of the auger and the second motor drive.

Additional features and advantages of the present invention will become apparent upon reading the following detailed description and the appended claims with reference to the accompanying figures.

BRIEF DESCRIPTION OF THE DRAWINGS

The subject matter which is regarded as the invention is particularly pointed out and distinctly claimed in the concluding portion of the specification. The invention, however, may be best understood by reference to the following description taken in conjunction with the accompanying drawing figures in which:

DETAILED DESCRIPTION OF THE PREFERRED EMBODIMENTS

Figure 1:
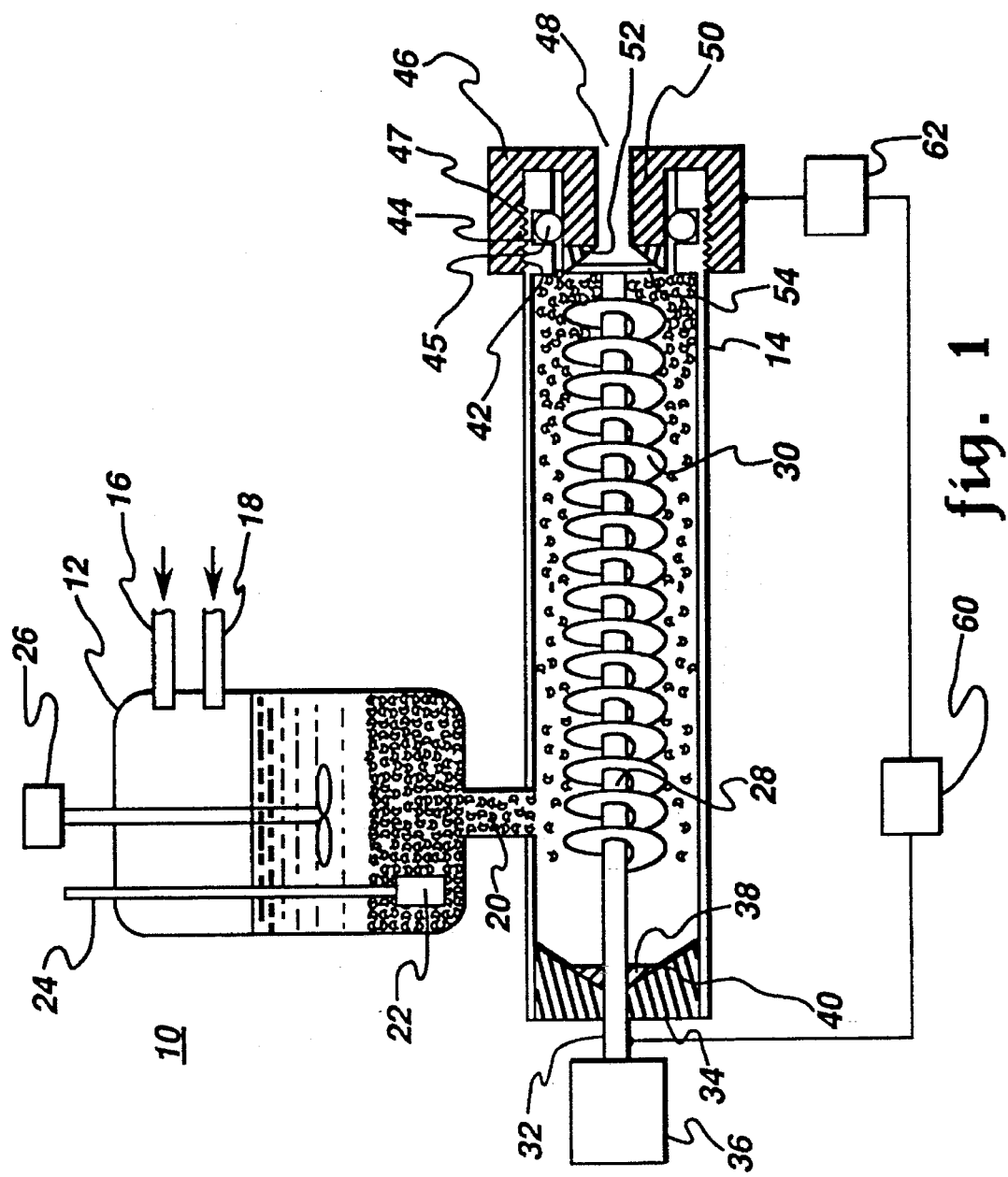
FIG. 1 is a schematic drawing of a side view of the apparatus of the present invention. It depicts a tightened movable cap and the anterior conical end of the auger resting on the anterior annular seat which prevents particle removal at the anterior portion of the barrel.
Figure 2:
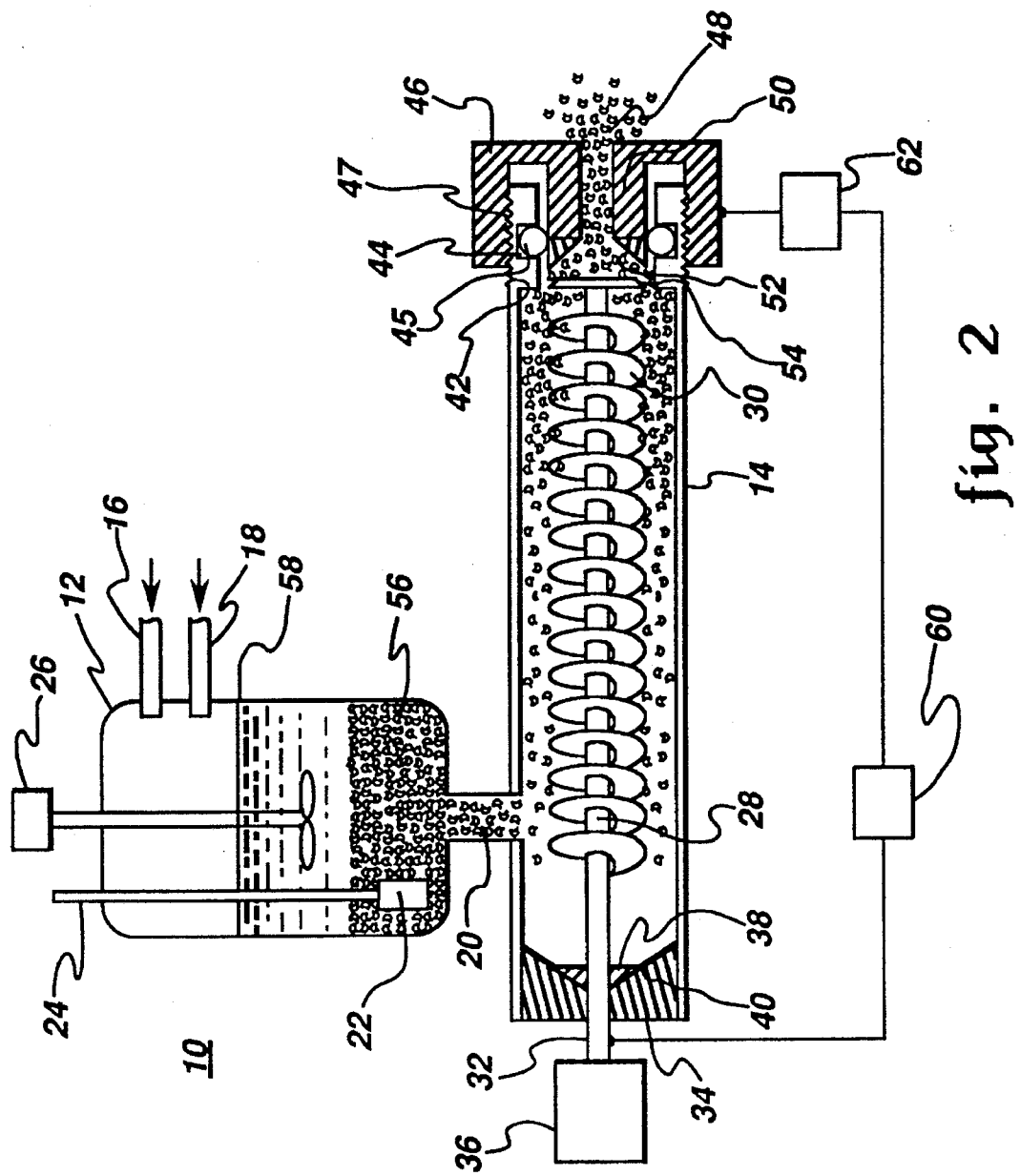
FIG. 2 is a schematic drawing of a side view of the apparatus of the present invention. It depicts the movable cap loosened and the anterior conical end of the auger away from the anterior annular seat which allows particle removal at the anterior portion of the barrel.
Figure 3:
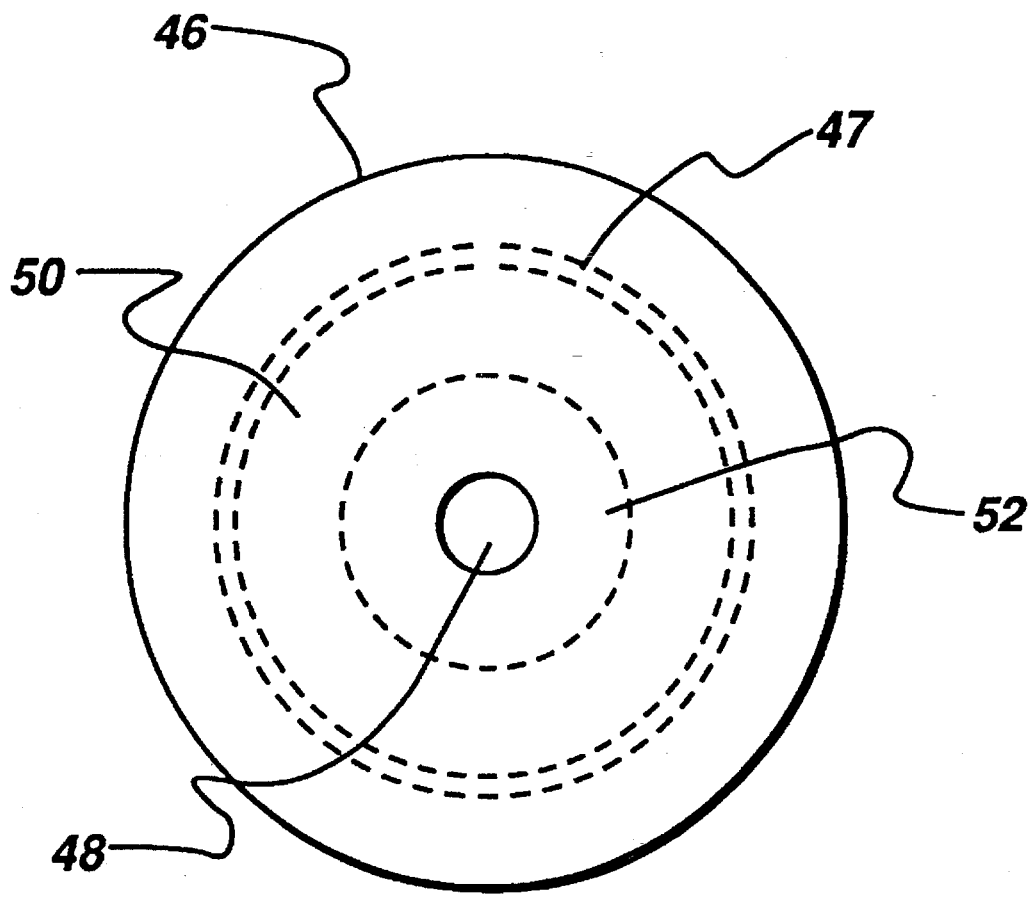
FIG. 3 is a schematic drawing of a cross-section of the movable cap of the present invention. It depicts the opening in the movable cap surrounded by the anterior annular seat.

Referring to the figures, an apparatus 10 for isolating solids from fluids is shown. The apparatus 10 comprises a mixing vessel 12 and a barrel 14. The mixing vessel 12 comprises a solution/mixture component inlet 16 and a gas/liquid component inlet 18. The mixing vessel 12 further comprises a particle passage 20 attached to said barrel 14, a filter 22 attached to a valve controlled outlet component 24 and an optional motor driven impeller 26.

The barrel 14 comprises, internally, an auger 28 having flights 30 and a posterior shaft 32 extending through the posterior portion of the barrel 34 and attached to a first motor drive 36. The first motor drive 36 is employed to rotate said auger 28 inside the barrel 14. The posterior end of the auger 28 is often conical and the posterior portion of the barrel 34 comprises an annular seat 40 inserted therein. The posterior annular seat 40 acts as a rest for the posterior conical end 38 of the auger 28. The posterior annular seat 40 and the posterior conical end 38 of the auger 28, together, act as a posterior dynamic seal for the barrel 14.

The anterior portion of the barrel 14 comprises external threads 42. Internally, the anterior portion of the barrel 14 comprises a groove 44 with an o-ring 45 inserted therein. Threaded on said external threads 42 of the anterior portion of the barrel 14 is a movable cap 46 comprising internal threads 47 and an opening to the atmosphere 48, an inner section 50 and internally and surrounding said opening to the atmosphere 48, an anterior annular seat 52 attached to said inner section 50. The anterior end 54 is conical and rests on the anterior annular seat 52. Together, the anterior conical end 54 of the auger 28 and the anterior annular seat 52 act as an anterior dynamic seal for the barrel.

The instant invention is not limited to any particular solids or fluids being isolated. If in fact a solution is introduced into the mixing vessel 12 by way of the solution/mixture component inlet 16, the gas being supplied into said gas/liquid component inlet 18 generally induces precipitation of solid from the solution. In this instance, the gas typically dissolves in the solution resulting in solid precipitation, and a motor driven impeller 26 may be employed in order to enhance the gas dissolution. However, if a mixture (solid and liquid) is supplied to the mixing vessel 12 via the solution/mixture component inlet 16, the gas is not employed to induce precipitation in the mixture since solid to be isolated is already present. Moreover, the mixture could, if desired, be directly fed into the barrel without employing the mixing vessel.

In all instances, however, it is preferred to supply a gas or liquid component to the mixing vessel 12 via the gas/liquid component inlet 18 since it is preferable for the pressure inside the mixing vessel to be greater than external pressure.

Subsequent to charging the mixing vessel 12 with solution/mixture and gas or liquid, solid particles 56 settle to the bottom of the mixing vessel 12 and pass through the particle passage 20 into said barrel 14. The density of the solid particles causes the particles to enter the barrel 14. It is noted that the fluid level 58 remains constant in the mixing vessel 12. This is accomplished by the passage of liquid or liquid and gas under pressure through the filter 22 and into the valve controlled outlet component 24.

In the instant invention, a torque is created as a direct result of the rotation of the auger 28 (and inherently its flights 30) and the packing of solid particles 56 towards the anterior portion of the barrel 14 near the movable cap 46.

It is noted that when the movable cap 46 is tightened, the anterior conical end 54 of the auger 28 rests on the anterior annular seat 52 attached to the inner section 50 of said movable cap 46 forming the dynamic seal. When the dynamic seal is formed, no solid particles 56 or fluids escape from the barrel 14 via the opening to the atmosphere 48 in the movable cap 46. The torque is felt by said first motor drive 36 and said posterior shaft 32 and it continues to increase as more solid particles 56 pack near the anterior portion of the barrel 14.

When the torque felt by the first motor drive 36 and the posterior shaft 32 reaches a selected high, a conventional torque sensor 60 attached to said posterior shaft 32 senses the selected high torque and carries an electrical signal to a second motor drive 62 which actuates the movable cap 46 (causing it to loosen) resulting in a break in the dynamic seal. The dynamic seal is broken since the anterior conical end 54 of the auger 28 is no longer resting on the anterior annular seat 52. This in turn causes solid particles 56 to escape the barrel 14 via the opening to the atmosphere 48 in the movable cap 46. Therefore, in the instant invention, loosening the movable cap 46 means that the movable cap 46 moves away from the anterior conical end 54 of the auger 28 which prevents said anterior conical end 54 of the auger 28 from resting on the anterior annular seat 52 resulting in solid particle 56 escape from the barrel 14. It is noted that there is no limitation with respect to the bulk density of the solid particles 56 recovered; however, said bulk density is often between about 10 to about 30 lbs/ft$^3$ when polycarbonates are recovered.

When said solid particles 56 escape the barrel 14 via the opening 48 in the movable cap 46, the torque felt by the first motor drive 36 and the posterior shaft 32 subsequently reaches a selected low and the conventional torque sensor 60 attached to said posterior shaft 32 senses the selected low torque and carries an electrical signal to said second motor drive 62 which again actuates the movable cap 46; however, in a direction towards the anterior conical end of the auger 54 (thus tightening the movable cap 46). This in turn causes said anterior conical end 54 of the auger 28 to rest on the anterior annular seat 52 which reforms the dynamic seal preventing solid particles 56 from escaping the barrel 14; subsequently causing the process to begin again.

Moreover, the o-ring 45 inserted in the groove 44 prevents fluids from escaping the barrel under the movable cap 46. Additionally, solid particles as used herein, are meant to include solid particles and/or wetcakes. Selected high torque is defined as the torque setting selected on the conventional torque sensor 60 which results in the second motor drive 62 loosening the movable cap 46. Selected torque low is defined as the torque setting on the conventional torque sensor 60 which results in the second motor drive 62 tightening the movable cap 46. The second motor drive 62 employed in the instant invention may be any conventional drive unit used in the art that can tighten and loosen the movable cap 46. Often, said second motor drive 62 is mechanical, hydraulic, pneumatic or preferably electromechanical in nature.

The following example is provided to further facilitate the understanding of the invention and it is not intended to limit the instant invention.

EXAMPLE

A 1000 ml mixing vessel 12 equipped with a motor driven impeller 26 may be charged with 200 cm$^3$ of methylene chloride. $CO_2$ at 650 psig can be introduced into the vessel and the resulting mixture may be stirred at 1750 rpm until equilibrium is reached. A bisphenol A polycarbonate (BPA) solution comprising 14% by weight polycarbonate and 86% by weight methylene chloride may be pumped into the solution inlet 16 of the mixing vessel 12 at a rate of 50 cm$^3$/minute. The mixing vessel 12 may then be continuously charged with $CO_2$ at 650 psig until polycarbonate precipitates and is collected as solid particles. The solid particles enter the sealed barrel 14 of the apparatus 10 and the first motor drive 36 of the apparatus 10 is started so that the auger 28 rotates. Liquid is removed via an outlet 24 in order to maintain a constant liquid level 58 in the vessel. The solid particles 56 are carried towards the opening to the atmosphere 48 by flights 30 on the auger 28. They collect as a packed column near the opening to the atmosphere 48 of the barrel 14 creating a torque on the first motor drive 36 and the posterior shaft 32 of the auger 28. As a result, the conventional sensor 60 senses the torque and sends a electrical signal to a second motor drive 62 which loosens the movable cap 46 releasing the anterior dynamic seal on the barrel 14. Solid particles 56 subsequently escape the opening to the atmosphere 48 and are recovered and dried.

What is claimed is:

1. An apparatus for isolating solids from fluids, said apparatus comprising:
    a. mixing vessel attached to a barrel by means of a particle passage and said barrel comprises:
        (i) an internal auger with a posterior shaft, flights and anterior and posterior conical ends;
        (ii) an external surface with anterior external threads;
        (iii) internal anterior and posterior annular seats;
        (iv) a movable cap having an opening to the atmosphere, wherein said movable cap comprises internal threads complementary to the external threads of the barrel and an inner section having an anterior annular seat attached thereto; and
        (v) a first motor drive connected to the posterior shaft of the auger.

2. An apparatus for isolating solids from fluids in accordance with claim 1 wherein said anterior conical end of the auger and said anterior annular seat together form an anterior seal for the barrel.

3. An apparatus for isolating solids from fluids in accordance with claim 1 wherein said posterior conical end of the auger and said posterior annular seat together from a posterior seal for the barrel.

4. An apparatus for isolating solids from fluids in accordance with claim 1 wherein said posterior shaft is attached to a first motor drive which rotates said auger.

5. An apparatus for isolating solids from fluids in accordance with claim 1 wherein said mixing vessel has a motor driven impeller.

6. An apparatus for isolating solids from fluids in accordance with claim 5 wherein said mixing vessel has a gas/liquid inlet component.

7. An apparatus for isolating solids from fluids in accordance with claim 6 wherein said mixing vessel has a valve controlled outlet component with a filter.

8. An apparatus for isolating solids from fluids in accordance with claim 7 wherein said mixing vessel is pressurized.

9. An apparatus for isolating solids from fluids in accordance with claim 1 wherein said apparatus further comprises a torque sensor attached to said posterior shaft and a second motor drive which is mechanically, hydraulically, pneumatically or electromechanically in connection with said movable cap.

10. An apparatus for isolating solids from fluids in accordance with claim 9 wherein said second motor drive is attached to said movable cap.

11. An apparatus for isolating solids from fluids in accordance with claim 10 wherein said second motor drive is mechanical, hydraulic, pneumatic or electromechanical in nature.

* * * * *